United States Patent Office 3,522,627
Patented Aug. 4, 1970

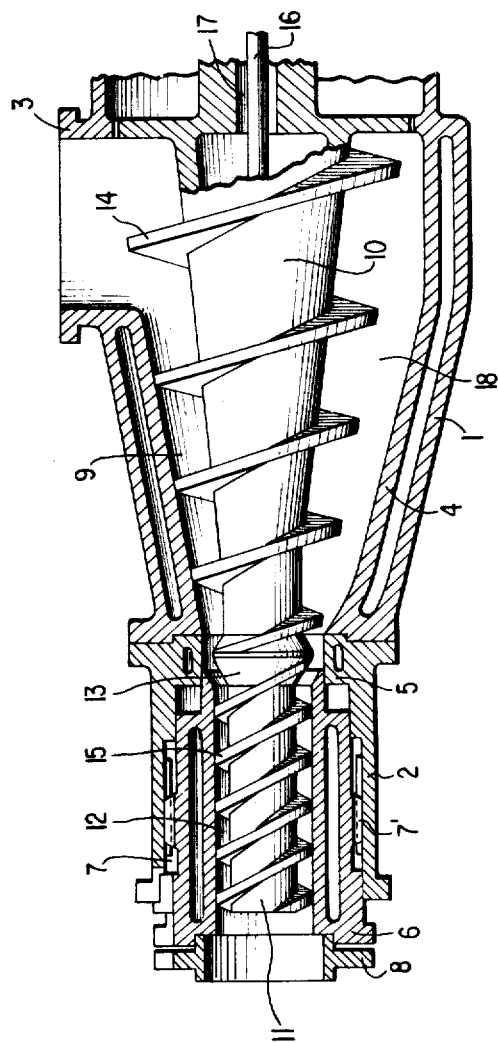
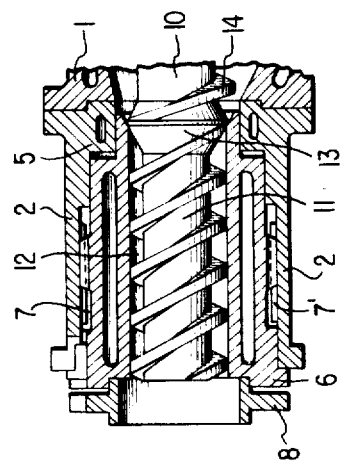

3,522,627
APPARATUS FOR THE CONTINUOUS TREATMENT OF PLASTIC MATERIAL
Marcello A. Vanzo, Milan, Italy, assignor to
S.p.A. Pirelli, Milan, Italy
Filed Apr. 1, 1968, Ser. No. 717,785
Claims priority, application Italy, Mar. 23, 1968,
14,306/68
Int. Cl. B29f 3/02
U.S. Cl. 18—12                                        11 Claims

ABSTRACT OF THE DISCLOSURE

An apparatus for the continuous treatment of plastic material by means of a screw rotatably assembled inside a hollow body provided at one end with an inlet for the supply of the material and at the opposite end with an outlet for the discharge of the same, and in particular by means of a screw consisting of a first portion, preferably frusto-conical, having the purpose of treating the material in such a way as to obtain its desired degree of plasticity and homogeneousness, and of a subsequent cylindrical portion which, according to its length, may serve only as a support for the downstream end of the screw portion preceding it, or also for creating in the already treated material a pressure sufficient to extrude the latter through a nozzle. An annular gap, defined by the inner surface of the cavity containing the screw and by the outer surface of an annular thickening of the screw core is foreseen at the passage from the first portion of the screw to the second. The area of said gap can be varied at will by means of an adjusting element axially slidable inside the hollow body.

BACKGROUND OF THE INVENTION

Field of the invention

The present invention relates to the continuous treatment of plastic material by means of an apparatus comprising a hollow body and a screw rotatably assembled inside it, provision being made of an element for regulating the flow of the material through an annular gap defined by the outer surface of a thickening of the screw core provided in an intermediate position of the latter, and by the inner surface of the cavity containing the screw.

PRIOR ART

In an apparatus for treating and extruding plastic material, a method for regulating the treatment time of the material by varying the length of the inlet for the supply of the material so as to vary correspondingly the length of the utilized portion for the treatment of the same is already known from the U.S. patent application No. 558,391, filed on June 17, 1966, by the same applicant. In the same patent application provision is also made, at a portion downstream the portion for treating the material, of an annular thickening of the screw core, which constitutes an element for a fixed regulation of the flow of material from the portion upstream said thickening to the downstream portion, and which also carries out a laminating action on the material passing through it.

Removable elements, having towards the screw axis a surface profiled in such a way as to form a continuation of the inner surface of the cavity containing the screw, were adopted to vary the length of the inlet for the supply of the material. However, the use of said closing elements did not allow in some cases a sufficient gradual regulation of the treatment degree of the material and moreover it involved greater dimensions of the apparatus to obtain the same results achievable by means of the regulating device described in the present invention. Further, the annular thickening of the screw core enabled a regulation of the flow of the material which was determined on designing the screw, but which could not be varied later on in accordance with the features of the treated materials and with the desired degree of treatment of the same.

SUMMARY OF THE INVENTION

The object of the present invention is an apparatus comprising: a body provided with a longitudinal cavity having at one end an inlet opening for the supply of the material and at the opposite end an outlet opening for the discharge of the same; a screw rotatably assembled in said cavity and having in an intermediate portion an annular thickening of its core; an element for regulating the annular gap defined by the outer surface of said annular thickening and by the inner surface of said cavity, said element being axially slidably assembled in the portion concerned with the screw portion downstream said thickening.

BRIEF DESCRIPTION OF THE DRAWINGS

The features of the present invention will be more clearly understood from the following description, made with reference to an embodiment of the same illustrated by way of non-limiting example in the attached drawings, in which:

FIG. 1 is a longitudinal section of an apparatus in accordance with the invention, in which the device for regulating the annular gap is disposed at the greatest pre-established distance from the annular thickening of the screw core, and FIG. 2 is a partial longitudinal section of the apparatus of FIG. 1, in which said regulating device is disposed at the smallest pre-established distance from the annular thickening of the screw core.

DESCRIPTION OF THE PREFERREED EMBODIMENT

The apparatus represented in the above figures comprises a frusto-conical hollow body 1 which is made fast, at its end of smaller diameter, with a cylindrical hollow body 2. A hopper 3 for the supply of the material is foreseen at the end of greater diameter of the frusto-conical body 1.

A stationary jacket 4 is provided inside the frusto-conical body 1 for the heating or the cooling of the material to be treated, and likewise a stationary jacket 5, made fast with jacket 4, is provided in the cylindrical body 2, as well as a jacket 6 axially displaceable in the body 2 by virtue of the keys 7 and 7'.

The cavity 9 of the frusto-conical body 1 contains, rotatably assembled, a portion of frusto-conical screw 10 which, at its end of smaller diameter, is made fast with a portion of cylindrical screw 11, rotatably assembled in the cavity 12 of the cylindrical body 2. At the ends of said two screw portions, mutually connected, the core of the screw is provided with a thickening 13 in the shape of a double frustum of cone.

The portion of frusto-conical screw 10 is eccentric with respect to the cavity 9 in which it is contained, and is provided with a thread 14, which winds up on the corresponding core at a pitch decreasing from the hopper 3 towards the die-holder 8. The portion of cylindrical screw 11 is instead centered with respect to the cavity 12 and is provided with a thread 15 which winds up at constant pitch on the corresponding core.

The screw 10, 11 can be heated or cooled by means of a fluid, which can be admitted into the hollow core of said screw through a tube 16 and can be discharged through the annular opening 17.

The conicity of the cavity 9 is greater than that of the addendum envelope of the thread 14 of the frusto-conical screw 10 and the axis of rotation of the frusto-conical screw portion 10 forms with the axis of symmetry of the cavity 9 an angle of such a value that a generatrix of the addendum envelope of the thread 14 may nearly meet, during rotation of the latter, with a generatrix of the cavity 9.

In the position diametrally opposite to the one where the two generatrices nearly meet with each other, the two generatrices of the same surfaces are spaced apart a distance which approximately corresponds to twice the difference between their respective conicities. It follows therefore that the addendum envelope of the thread 14 and the inner surface of the cavity 9 define a chamber 18 being of a height, radially measured in sections at right angles to the axis of the screw, varying from a minimum value, corresponding to the points at which said two generatrices nearly meet with each other, to a maximum value corresponding to the diametrally opposite position, and returning again to a minimum value, corresponding to the points at which the two generatrices nearly meet with each other.

On the contrary, the cylindrical screw portion 11 is centered in the cavity 12 and therefore its thread 15 nearly meets with the jacket 6.

The axial displacement of the jacket 6 with respect to the cylindrical body 2 can be controlled for instance by means of any known device, provided with micrometric screw, which permits to impart to said jacket axial displacements even of small entity.

Of course, the constructional details of the apparatus forming the object of the present invention may be varied with respect to what is indicated in the illustrated example without falling out of the field of the invention itself.

As it can be easily deduced from the above description, the device for regulating the flow of material from the cavity wherein it is treated to the cavity containing the screw portion supporting the downstream end of the screw or also creating the pressure necessary for extruding the material through a die affords the advantage of ensuring the greatest graduality of said regulation, and is easily controlled from the outside.

Moreover, at equal performance, it permits to reduce in a considerable manner the dimensions of the apparatus in comparison with that described in the above mentioned patent application, since also a material requiring a longer treatment may be treated in a screw of the same length as that designed for treating materials requiring a shorter treatment.

Consequently, it is possible to avoid the troublesome application and removal of the closing elements at the hopper.

I claim:

1. An apparatus for the continuous treatment of plastic material, comprising: a body provided with a longitudinal cavity having at one end an inlet opening for the supply of the material and at the opposite end an outlet opening for the discharge of the same; a screw rotatably assembled in said cavity and having in an intermediate portion an annular thickening of its core; an element for regulating the annular gap defined by the outer surface of said annular thickening and by the inner surface of said cavity, said element being axially slidably assembled in the portion concerned with the screw portion downstream said thickening.

2. The apparatus as in claim 1, in which the thickening of the screw core has the shape of a double frustum of cone.

3. The apparatus as in claim 1, in which said axially slidable regulating element is constituted by the jacket of the portion of cavity situated downstream said thickening.

4. The apparatus as in claim 3, in which said regulating element, at its end turned towards the inside of the apparatus, has a frusto-conical surface diverging in said direction.

5. The apparatus as in claim 3, in which said regulating element, at its end turned towards the outside, is made fast with a die-holder.

6. The apparatus as in claim 1, in which the screw is constituted by a first frusto-conical portion whose diameter decreases from the hopper towards the discharge opening, and by a subsequent cylindrical portion, said annular thickening of the core being interposed between said screw portions.

7. The apparatus as in claim 1, in which the frusto-conical portion of the screw is provided with at least a thread, whose coils define at least a helical channel whose cross section decreases from the inlet end to the outlet end, and is assembled in the corresponding cavity in such a way that the addendum envelope of its thread defines with the inner surface of said cavity at least a chamber being, in each section at right angles to the axis of the screw, of a height, radially measured with respect to said screw, varying from at least a minimum value to a maximum value and returning to a minimum value.

8. The apparatus as in claim 7, in which the conicity of the portion of frusto-conical screw is smaller than the conicity of the corresponding cavity throughout at least a portion of the length of the latter, the axis of the screw forming with the axis of said cavity an angle which is equal to one-half the angular difference between said conicities.

9. The apparatus as in claim 7, in which said chamber and said channel are in completely open communication throughout their respective lengths.

10. The apparatus as in claim 7, in which the height of the chamber is minimum at a point approximately 180° from the point where the height of said chamber is maximum.

11. The apparatus as in claim 7, in which the positions of minimum height of said chamber are aligned according to a generatrix of the cavity containing the portion of frusto-conical screw.

References Cited

UNITED STATES PATENTS

| | | |
|---|---|---|
| 830,201 | 9/1906 | Blondel. |
| 2,595,455 | 5/1952 | Heston. |
| 2,970,341 | 2/1961 | Mallory et al. |
| 3,343,214 | 9/1967 | Myers. |

WILLIAM J. STEPHENSON, Primary Examiner

U.S. Cl. X.R.

18—14